(12) United States Patent
Picard (10) Patent No.: US 6,284,310 B2
(45) Date of Patent: Sep. 4, 2001

(54) METHOD AND APPARATUS FOR THE PREPARATION OF MONOLAYERS OF PARTICLES OR MOLECULES

(75) Inventor: Gilles Picard, Turin (IT)

(73) Assignee: Nano World Projects Corporation, Vancouver (CA)

( * ) Notice: Subject to any disclaimer, the term of this patent is extended or adjusted under 35 U.S.C. 154(b) by 0 days.

(21) Appl. No.: 09/424,250

(22) PCT Filed: May 25, 1998

(86) PCT No.: PCT/IT98/00131

§ 371 Date: Nov. 30, 1999

§ 102(e) Date: Nov. 30, 1999

(87) PCT Pub. No.: WO98/53920

PCT Pub. Date: Dec. 3, 1998

(30) Foreign Application Priority Data

May 30, 1997 (IT) .............................................. TO97A0466

(51) Int. Cl.[7] ..................................................... B05D 1/28
(52) U.S. Cl. .................. 427/180; 427/434.5; 427/443.2; 427/428; 118/402; 118/419; 118/427
(58) Field of Search ..................................... 427/428, 180, 427/430.1, 434.5, 443.2, 434.3; 118/404.05, 402, 409, 414, 416, 419, 427

(56) References Cited

U.S. PATENT DOCUMENTS 4,093,757 * 6/1978 Barraud et al. .
4,511,604 * 4/1985 Barraud et al. .
5,173,365 * 12/1992 Singh et al. .
5,429,842 * 7/1995 Appel et al. .

FOREIGN PATENT DOCUMENTS

| 0 541 401 | * | 5/1993 | (EP) . |
| 0 575 215 | * | 3/1994 | (EP) . |
| 0 640 406 | * | 3/1995 | (EP) . |
| 0841099 | * | 5/1998 | (EP) . |
| 2 341 188 | * | 9/1977 | (FR) . |
| 62-004468 | * | 1/1987 | (JP) . |
| 5-057227 | * | 3/1993 | (JP) . |

* cited by examiner

Primary Examiner—Fred J. Parker
(74) Attorney, Agent, or Firm—Oblon, Spivak, McClelland, Maier & Neustadt, P.C.

(57) ABSTRACT

A method and an apparatus are described to prepare monolayers of particles (or molecules) (3), realizing the steps of: injecting a liquid film (2) with particles (3) dispersed on the external surface of a rotary member (1); adjusting the surface charge density of the particles (3) by injecting adsorption reagents (10), carrying particles (3) placed on film (2) surface so that they form a substantially uniform monolayer (5); putting the monolayer (5) on the liquid film surface (2) in contact with a substrate (7); and advancing the rotary member (1) longitudinally with respect to the substrate (7), in both directions, so that the monolayer (5) is detached from the liquid film (2) and attached to the substrate (7).

15 Claims, 3 Drawing Sheets

METHOD AND APPARATUS FOR THE PREPARATION OF MONOLAYERS OF PARTICLES OR MOLECULES

The present invention refers to a method and a apparatus for the preparation of monolayers of particles or molecules.

BACKGROUND OF THE INVENTION

The fabrication of monolayers of insoluble particles to the gas-liquid interface was realized through uses of troughs usually full of aqueous solutions. To the gas-water interface, solutions containing amphiphilic molecules are usually spreaded, these being molecules made of a polar head and a chain of fatty acids. After the volatile solvent has evaporated, it leaves at the gas-liquid interface the amphiphilic molecules. Finally, a mobile barrier compresses the molecules in a monolayer. Therefore, essentially there occurs an immobile trough containing an unmoving subphase or which molecules are laterally transported through it by exploiting the surface tension difference between the subphase and the deposited solution, and a mobile barrier.

The transfer of the monolayer onto a solid substrate is realized through several methods. One is the so-called Langmuir-Blodgett method, and essentially comprises a vertical immersion of a solid plate in the subphase through the monolayer; by pulling up such plate, the layer is transferred onto the plate by lateral compression. That can be repeated many times. Another method, called the Langmuir-Schaeffer method, comprises the descent of an horizontal plate onto the monolayer. After a contact is made, the plate is again extracted with the monolayer on it.

In order to improve the fabrication of insoluble particles, several attempts have been carried out. One has been to make a cylinder rotate under the water surface. One expected that such movement drove the insoluble particles ahead in a forming monolayer. However, in the majority of cases, this technique requires a precompression of an already prepared monolayer. The cylinder that compresses the layer is made of hydrophobic material. Moreover, only insoluble molecules are usable. Another device has been recently disclosed by G. Fuller, C. Franck and C. Robertson (Langmuir, 10, 1251 (1994)). It comprises the compression of insoluble particles with a flowing subphase between a fixed surface and the monolayer surfaces. Again, only insoluble molecules are used.

There are several limits in these previous methods: the essential one is that these methods are provided for insoluble particles. The attempts to extend the above methods to soluble particles have supplied marginal results. Slowness, loss of particles, low reproducibility and denaturation of proteins are a general characteristic of these methods.

The Applicant of the present invention and others disclosed a new method in the course of 1997 (Picard G., Nevernov I., Alliata D. and Pazdernick L., Langmuir, 13, 264 (1997)). The method has been marked with the acronym DTLF (Dynamic Thin Laminar Flow), and comprises a rotary cylinder that compresses a monolayer of soluble proteins. It was specifically planned in order to manufacture monolayers of soluble proteins, even if monolayers of soluble particles can also be easily realized. The features of this DTLF method are high-speed production, low amounts of materials being used, continuous production and preparation of bidimensional crystals. The newly prepared monolayer can also be deposited for further analysis on a solid, unmoving substrate. In other words, the device can be moved on a fixed substrate in order to deposit monolayers.

Even if in this study a machine has been disclosed that proved to be functional with proteins, the basic principles governing the DTLF method were not explained. This means that the use of such apparatus can be even useless if the basic forces are not controlled.

SUMMARY OF THE INVENTION

Object of the present invention is solving the above prior art problems, providing the basic principles for the DTLF method in such a way as to extend the application to the preparation of amorphous or crystalline monolayers of all kind of particles and their following transfer on any type of liquid or solid substrate.

A further object of the present invention is providing an apparatus for the simple, efficient and inexpensive realization of the above mentioned inventive method.

The basic principles of the DTLF method are based on the combination of three different processes. The first one is that it is necessary to use a thin liquid film: its thinness must be in the micrometer range. The second is the control of electrical charges of the particles in the thin liquid film in order to provoke the adsorption of particles to the gas-liquid interface without provoking the adsorption between them to the gas-liquid interface or in the thin liquid film itself. The third part is that, in order to create a force to drive particles against an edge for compression, the surface, on which there is the thin liquid film, is moved. This movement pushes the thin liquid film ahead and creates, through the liquid viscosity, a surface force that finally pushes particles ahead.

These and other objects are achieved according to the invention, the first embodiment of which includes a method for the preparation of a monolayer of particles or molecules, comprising:

injecting a thin liquid film containing said particles or molecules onto an external surface of a rotary member;

adjusting a surface charge density of said particles or molecules through the injection of an adsorption reagent, thereby carrying said particles or molecules to a gas-liquid interface of said thin liquid film;

forming a uniform monolayer of said particles or molecules on said gas-liquid interface;

transferring said monolayer from the gas-liquid interface to a solid substrate; and moving said rotary number in a longitudinal direction relatively to said substrate, thereby separating said monolayer from said thin liquid film and adsorbing said monolayer to said substrate.

Another embodiment of the invention includes an apparatus for the preparation of a monolayer of particles or molecules, comprising:

a rotary member;

a motor;

an injection module having a plurality of openings;

a channel for injecting a thin liquid film;

a channel for injecting an adsorption reagent;

a channel connected to a suction pump; and a substrate;

wherein said rotary member is actuated for forming a monolayer on a gas-liquid interface of a thin liquid film in contact with said substrate; and wherein said rotary member can advance in a longitudinal direction with respect to said substrate.

BRIEF DESCRIPTION OF THE DRAWINGS

The present invention will be better described by some preferred embodiments thereof, provided as a non-limiting example, with reference to the enclosed drawings, in which.

DETAILED DESCRIPTION OF THE INVENTION

In the course of the present description, the term "particle" means every type of molecules, polymers or aggregates whose mean diameter size is less than 100 microns.

Basic DTLF Method Principles

The DTLF method requires the simultaneous existence of two characteristics: a liquid subphase around 1 to 10 micron thick and one mobile surface. This thinness is important for the DTLF process because the particles in the thin liquid film will meet several times the gas-liquid interface during their transport due to the mobile solid surface. Another important aspect of the DTLF process is that the thinness of the film means having to deal with very small liquid volumes, in the microliter range. That means moreover that whichever modification of the physico-chemical features of the liquid film requires injecting or pumping outside small amounts of buffers or solutions. Moreover, the qualitative answer to any subphase modification is fast.

The second important feature is that the surface, on which the thin liquid film rests, is moving. This movement drives the solid-liquid interface and, because of the viscosity of the liquid, this movement is transmitted layer by layer up to the gas-liquid interface. These movements provoke the convection in the thin liquid film that transports particles towards the gas-liquid interface in an efficient way. Moreover, this transport is eased by the Brownian motions when the particles are at molecular level. Production efficiency can easily reach 100%.

These two features have been described in the above-said prior publication (Picard G., Nevernov I., Alliata D. and Pazdernick L., Langmuir, 13, 264 (1997)). However, these features would be useless without other considerations. The apparatus described in such publication, for example, would make particles endlessly rotate around the cylinder, if no further manipulations of the thin liquid film were carried out. These manipulations essentially comprise the adjustment of surface charge densities for the particles, that is an important factor in the determination of the adsorption of particles at the gas-liquid interface.

Particle stability in the mass occurs because repulsion forces between particles are greater that attraction forces. For example, a high surface charge density means that the particles will remain in the mass, in solution or suspension. In this condition, no formation of monolayers is possible. The weakening of the surface charge density for particles will also weaken the repulsion force. It has been determined that the first phenomenon that takes place is the adsorption of particles at the gas-liquid interface. The final result, which is assembling the particles in a monolayer, is the same. Essentially, with the DTLF method the only two parameters to be controlled are the ionic forces in the subphase, for the particle A/W adsorption, and the surface forces that are pressing the particles onto the monolayer, the surface force depending only on the cylinder rotation speed and the thin liquid film thickness. The further reduction of the repulsion forces provokes at the same time a second phenomenon that is the particle-particle adsorption at the gas-liquid interface. Therefore, aggregates are observed on the liquid surface, while in the mass particles remain balanced. Going on reducing the repulsion force between particles, particle to particle adsorption in the mass will be created. That will generate the precipitation of particles in the mass.

Clearly, the DTLF method works as soon as the particles in suspension or in solution are under unbalance conditions. In the majority of cases, this condition is present near the iso-electric point. A range of subphase conditions for every type of particles exist for an optimum adsorption at the gas-liquid interface. This optimum conditions can be found by injecting and pumping out liquids during the monolayer treatment, and following the monolayer production in real time.

The fact that the surface, on which the thin liquid film rests, is moving implies that as soon as the particles are absorbed, they are compressed against the edge of the growing monolayer. Particles arrive one after the other. This sequence of arrival is very favorable for the formation of large bidimensional crystals with particles. Such crystals have been observed for protein and polystyrene particles. In principle there are no limits for the size of particles and the nature of their material can be gold, silver, glass, etc.

The Inventive Apparatus

Figure 1:
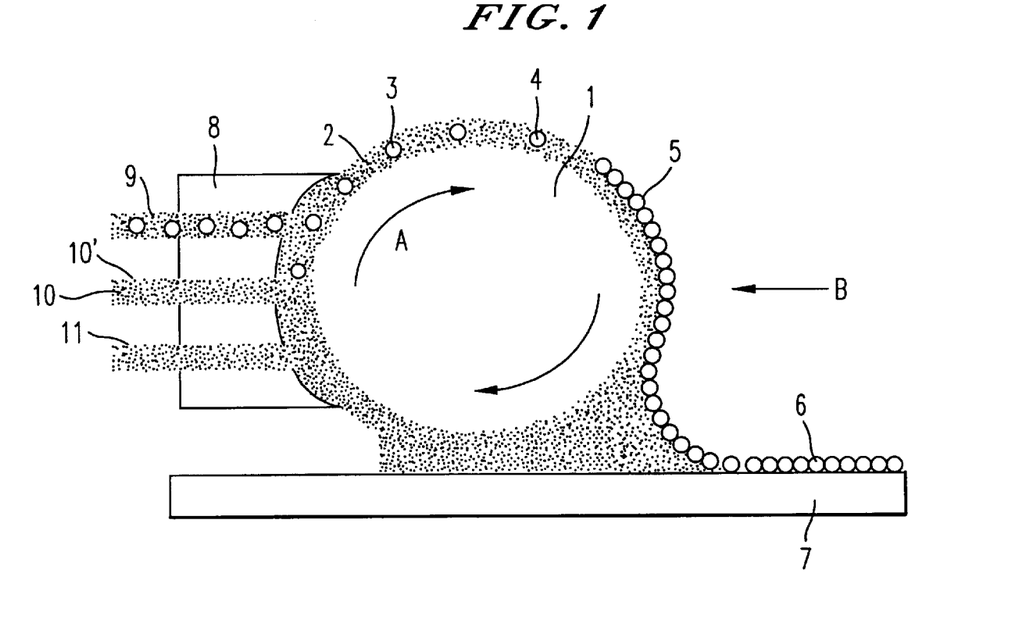
FIG. 1 is a side schematic view of a first embodiment of the apparatus according to the present invention.
Figure 2:
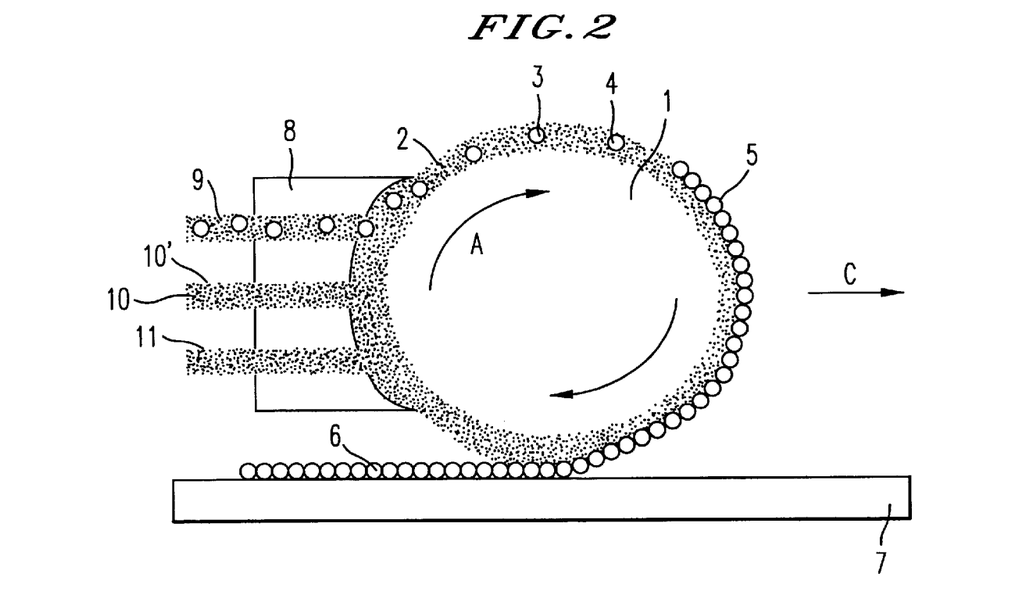
FIG. 2 is a side schematic view of a second embodiment of the apparatus according to the present invention.
Figure 3:
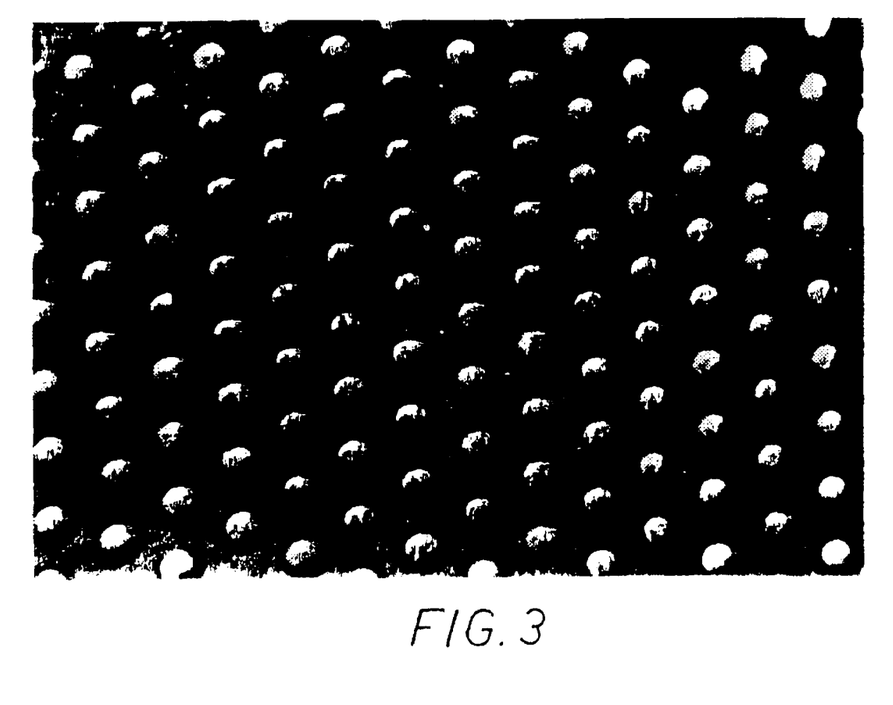
FIGS. 3 and 4 are optical microscopic images of particles on the upper part of the rotary element of FIGS. 1 and 2.
Figure 4:
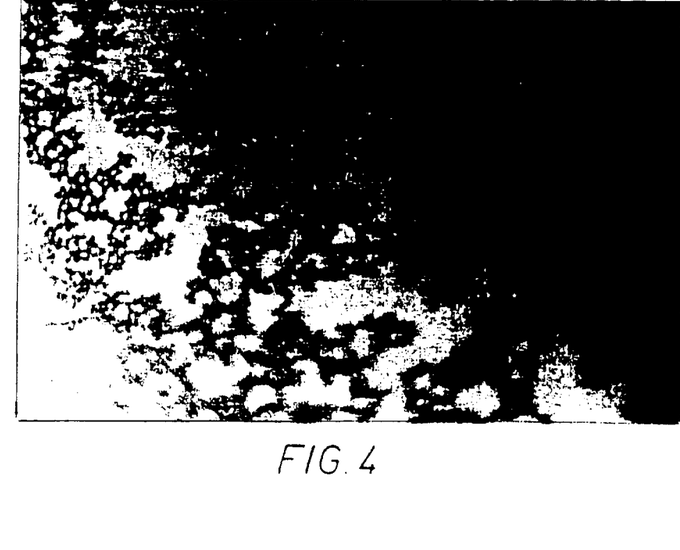
Figure 5:
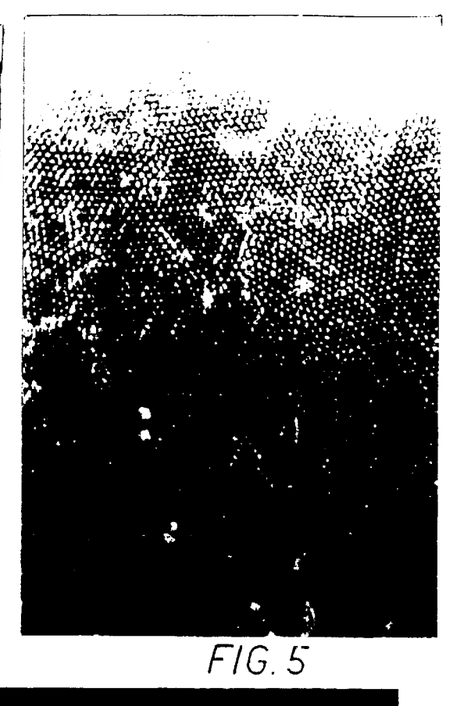
FIGS. 5 and 6 are optical microscopic images of small particles realized with the DTLF method of the present invention.
Figure 6:
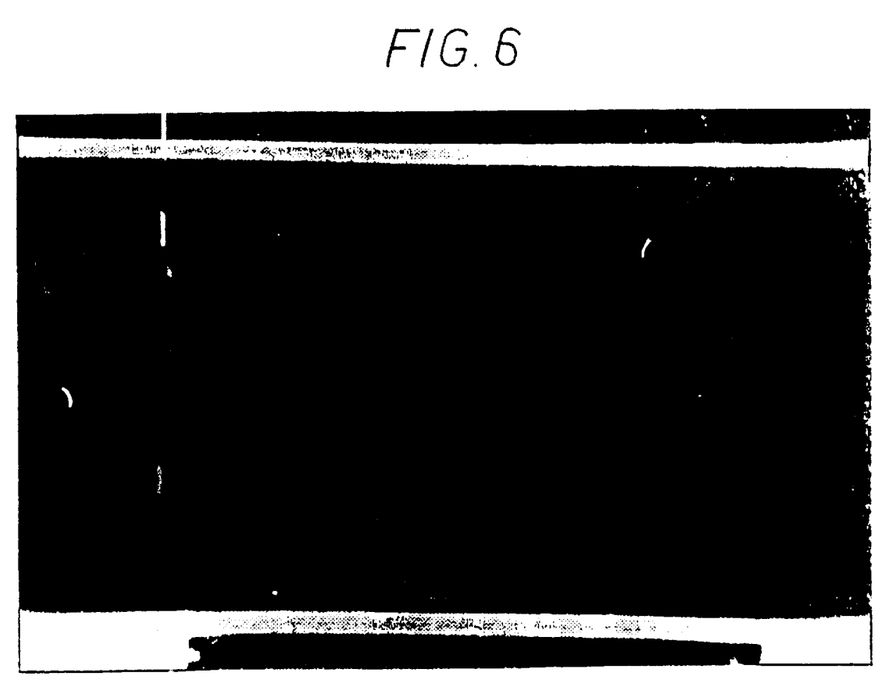
Figure 7:
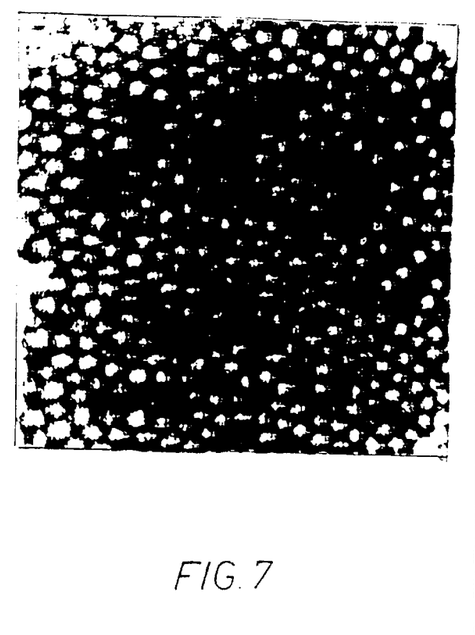
FIG. 7 is an image from an atomic force microscope of a monolayer of ultrasmall particles realized with the DTLF method of the present invention.

With reference to FIGS. 1 and 2, two preferred embodiments are shown of an apparatus to carry out the DTLF method according to the present invention. The inventive apparatus shown in FIG. 1 comprises a rotary member 1, in this case a clockwise-rotating cylinder, to which an injection module 8 is connected, this module 8 being equipped with three openings with respective inlet and outlet channels for the fluid: a channel 9 through which a thin liquid film 2 is injected, through adequate means (not shown), this film 2 containing a suspension of particles or proteins 3; a channel 10' through which, through adequate means (not shown), adsorption reagents 10 are injected to be put in contact with particles 3 in suspension in the thin liquid film 2; and a channel 11 connected to a suction pump (not shown), to suck the thin liquid film 2 after the deposition of the monolayer 5.

The apparatus in FIG. 1 comprises moreover a substrate 7 on which the monolayer 5 is deposited. According to what is shown in FIG. 1, particles 3, after their surface charge density is modified by means of contact with reagents 10, are carried to the surface, that is at the gas-liquid interface, and are therefore adsorbed, as clearly appears from the particles designated by reference number 4. The rotation of the rotating member (arrow A) pushes particles 4 one against the other to form a continuous and uniform monolayer 5. By going on rotating member 1 and parallely by moving it in the lengthwise direction to a substrate 7 (in FIG. 1 in the direction of arrow B that is the opposite regarding the rotation sense for member 1), the monolayer 5 is deposited on the substrate 7 together with the thin liquid film 2, that is then sucked away by means of suction means 11. A monolayer of particles 6 will be obtained and therefore transferred onto the solid substrate 7, than in case of FIG. 1 is a hydrophobic substrate made with a slide of glass or metal.

The embodiment in FIG. 2 is the same as the one in FIG. 1 (and therefore the same parts are designated by the same reference numbers), apart from for the fact that the substrate 7 is made of hydrophylic material, that is composed of a clean glass plate or a mica sheet. Therefore, in this case, the deposition of monolayer 6 on it is carried out making the rotary member 1 advance in the direction of arrow C, that is the same as the rotation sense of the member.

The apparatus and method of the present invention operate in a similarly effective way if the substrate 7 is composed of any type of liquid, on which it will therefore be possible to deposit one or more monolayers (through one or more successive application passes) of particles or molecules.

Some practical applications of the method and the apparatus according to the present invention provide that such adsorption reagents 10 are made of an acidic solution to a pH equal to approximately 4.0 for particles 2 of polystyrene or protein molecules. According to another example, the adsorption reagents 10 are composed of a solution made of 70% of acetonitrile for particles 2 of carbon 60 in a toluene film. According to a further example, the adsorption reagents 10 can be a salts solution, in particular a cadmium sulfate solution for molecules 2 of proteins of the holoferritin type.

The invention can be practiced by realizing filters for ultrafiltration, whose pore diameter ranges from 1,000 to 1 nanometer.

EXPERIMENTAL EXAMPLES

The DTLF method will be better described hereinbelow with reference to a set of experimental tests. All experiments were performed in a clean room. The dust level was measured by a commercial dust detector for white room quality control.

The prototype testing this new method is shown in FIG. 1, in side and top views. The glass cylinder was 6 mm in diameter and 50 mm long. The glass cylinder surface was polished with fine abrasives for commercial lenses until no scratch could be seen at 1000X magnification with an optical microscope. A hemi-cylindrical trough was obtained by cutting out and drilling a 10×3.5×0.5 cm PTFE plate. A DC electric motor with a speed control up to 3 Hz was used to drive the glass cylinder. DC electric motor and glass cylinder were mechanically connected by means of a thick rubber tube, in order to transmit torque while damping vibrations. The cylinder was held horizontally by two PTFE circular plates drilled at 2 mm from the center. The gap between the cylinder and the hemi-cylindrical trough could be adjusted to about 300 $\mu$m by simply rotating the circular plates. After a vertical position was found, the circular plates were clamped firmly on a rigid Plexiglass structure.

The polystyrene particles for the tests were from Interfacial Dynamics Corporation (IDC), Portland, Oreg., U.S.A. The particle concentration was always 4% w/w. Only the fluorescent 0.22-$\mu$m particles were from Polysciences, Warrington, Pa. The buffers and NaCl (99.99%) were from Merck. Water was distilled (Aquatron BS I) and demineralized (Elgastat UHQ II) before use. Its surface tension was higher than 72 mN.m$^{-1}$ and its conductivity equal to 18 M$\Omega$.cm$^{-1}$.

Six channels controlling subphase volume inlet, pH and thin liquid film thickness above the cylinder were drilled in the lateral portions of the PTFE hemi-cylindrical trough. At the bottom of the trough and parallel to the cylinder axis a groove was drilled to hydraulically connect all channels for a better mixing of injected fluids. When salt was used for the formation of the latex particle monolayer, the subphase was thoroughly rinsed by simultaneously injecting pure water and pumping the subphase away. The prototype was mounted on an optical microscope bench for in situ observation of the particle monolayers and the rinsing procedures.

The subphase pH or salt concentration were gradually modified and adjusted with the syringe graduations. The thickness of the thin liquid film around the cylinder was finely controlled by the use of an optical microscope focal depth. The subphase conditions are shown in Table 1 with the corresponding observations.

The preparation of 6- to 0.6-$\mu$m particle monolayers was quite easy, because the monolayers could be seen as a white coating material over the cylinder. Thus the procedure just consisted in injecting the particles into the thin liquid film with a pipette and in looking at the growing white film. The injection of particles was gradual, keeping the monolayer speed of preparation constant. Once the hemi-cylindrical surface was totally covered, the injection was stopped. The film could be observed during the growing process, and transferred later onto a solid substrate for further observations. The reduction of the particle size made the direct visual observation of the monolayer increasingly difficult. The white film became whitish with the 1-$\mu$m spheres and translucide with the 250 nm ones. At this point the observation procedure was made by means of an optical microscope.

For particles smaller than 250 nm an optical microscope with its objective over the top of the cylinder, in incident light and darkfield mode illumination, was used. The in situ observation of the particle monolayers required an interval of time between the particle injection and the setting up of the microscope, because of the short objective-water distance of about 1 mm. Photographs were taken after the transfer on a solid substrate with a 100 ASA commercial film.

When salt was used, a rinsing subphase was used. A microscope at 200X magnification vertically positioned above the cylinder was used for the observation of polystyrene monolayer preparations. With the optical microscope focused on the film, the cleaning sequence started. This allowed the liquid to axially flow axially from one extremity of the cylinder base to the other 4- to 16-ml of pure water was usually flown through.

The method of transferring the particle monolayer was the horizontal deposition. It consisted in bringing in contact a water film on a wetted hydrophilic surface with the water film around the rotating cylinder. The surface concerned was a hydrophilic microscope cover slip with its dry surface on the PTFE surface and its upper surface wetted. The contact was made at the base of the cylinder by sliding horizontally the microscope cover slip until the two water films fused by capillary forces. As soon as the contact was made the particle monolayer over the cylindrical thin film surface, blocked until then by the hydrophobic PTFE corner, was driven forward by the cylinder over the wetted glass surface.

After this horizontal movement, the excess liquid that connected the cylinder and the microscope cover slip was pumped away by using the 2-way pump, and the particle monolayer was finally disconnected from the cylinder. The particle monolayer was then left free floating over a thin liquid film, which was coating the glass surface. The thin liquid film evaporated through the particle monolayer, thus the particle monolayer made a slow descent until the touch down onto the microscope cover slip, that is a particle monolayer was transferred by horizontal deposition over the glass slide.

Dynamics of Thin Liquid Films

A glass cylinder revolving under a particle monolayer with a thin film of water in between can be represented by two concentric cylinders, the central one rotating and the outer one fixed, with fluid in between. This is the well-known Couette viscometer. The mathematics connecting this viscometer with the DTLF method has already been developed for the experiments with proteins. Although the experimental conditions were with polystyrene spheres, the Taylor number remains Ta=$1.48 \times 10^{-5}$. Since instability appears at the critical Taylor number Ta$_c$=1.712, this certifies that the flow between the particle monolayer and the glass cylinder surface will be laminar. The thinness of the liquid film is largely responsible for this high stability.

The particle monolayer dimensions being in a 10,000:1 ratio with the film thickness, the end effects can be neglected and the cylinder can be considered as infinite. Again, using the same argument, the cylinder radius being in a 1,000:1 ratio with the film thickness, the cylinder-in-cylinder model can be mathematically reduced to a plate parallely moving above a fixed one, with a fluid in between. In our system the moving plate was the cylinder surface and the fixed plate, the particle monolayer. The force created by the rotating cylinder on the particle monolayer was put in equation:

$$\Pi = \frac{2\pi \cdot \eta \cdot R_C \cdot f \cdot x}{z} \quad 0 \leq x \leq L_h$$

where $\eta$ is the liquid viscosity (for water, $10^{-3}$ kg/m s), $R_c$ the cylinder radius, f the cylinder rotation frequency, x the length of the monolayer and z the thickness of the thin liquid film. $L_h$ is the hemi-cylindrical circumference. It was demonstrated that you can reach surface pressures up to collapse point.

Optical Microscopy at the A/W Interface

The injection of 6-$\mu$m polystyrene spheres in the thin liquid film of water produced a growing white solid film of polystyrene particles. At neutral pH, the electric charges around the particles created repulsive forces that efficiently provided any kind of particle adsorption. As a consequence, the particles turned with the cylinder without making monolayers. Lowering the pH to 4.0 reduced the surface charges of the particles. Then, a progressive adsorption of particles at the A/W interface occurred. The regular rotation of the cylinder compressed the just-emerged particles, leading to a uniform monolayer preparation. At pH 4.0, the ionic repulsive forces are still enough to keep the particles apart at the A/W interface. This repulsion is well know to be important for the formation of 2D crystals. As a matter of fact 2D crystals were observed, in particular when the injection was smoother. Further reducing the electric charges of the particles by lowering the pH to 3.5 led to surface aggregation. In fact 2D fractals were observed. At pH 3.0, 3D aggregates were clearly visible. This indicates that particle-particle absorption in the bulk occurred rapidly.

This dependence of monolayer preparations on the subphase ionic conditions proved to be true for all sulfate- or carboxyl-coated latexes; however, the values varied somewhat from size to size (see Table 1). This observation will be further analyzed in the Discussion section. Another relevant observation is that reducing the pH to 0.0, did not provoke the aggregation of the 0.250 $\mu$m CML particles, while an amount of 1 M of salt in pure water provoked their adsorption at the A/W interface. Increasing the salt concentration, which is screening furthermore the surface charges of the particles, led to surface and bulk aggregations, as well.

Optical Microscopy at the Air-Solid Interface

The monolayers at the A/W interface could be cried down onto the cylinder glass surface, and examined with the optical microscope. Otherwise the film could be transferred onto a glass slide or a mica sheet. In any cases the observation at the air-solid interface allowed a better evaluation of the particle packing.

Using the 1.17-$\mu$m particles that were assembled by DTLF method. It is quite clear that the good packing of particles occurred because of the introduction of the particles in the monolayer one after the other. Smaller particles, i.e. 0.614 $\mu$m, were also well packed. It must be noted that the linear speed of preparation of 0.614-$\mu$m particle monolayer could reach 1 mm/s.

AFM Microscopy at the Air-Solid Interface

The nanospheres were seen with the AFM microscope. An AFM image of a 127-nm particle monolayer shows the particle monolayer is quite uniform. It is also possible to see small nanosphere 2D crystals. Also in this case, the linear preparation speed of the monolayer was ≈1 mm/s.

Table 1 summarizes the results. The data are shown in decreasing order of particle diameter. Hydro-affinity was the only parameter that prevailed for the choice of the ionic conditions. One of the main features is that the subphase conditions for the preparation of particle monolayers were not much different between the biggest and the smallest spheres.

TABLE 1 particle properties, subphase initial conditions and observation of the monolayer preparations.

| Diameter ($\mu$m) (1) | Time (s) (2) | Particle Type (3) | Surface charge ($\mu$C/cm$^2$) (4) | [NaCl] M | pH | Visual aspect on water (5) | Visual aspect on solid (5) | Microscopic observation |
|---|---|---|---|---|---|---|---|---|
| 6.240 | — | Sulfate | 4 | Nil | 7.0 | — | — | Nothing |
| " | 30 | " | " | " | 4.0 | Mat white | Mat white | 2D crystals |
| " | — | " | " | " | 3.5 | Frosty | Frosty | 2D |

TABLE 1-continued particle properties, subphase initial conditions and observation of the monolayer preparations.

| Diameter ($\mu$m) (1) | Time (s) (2) | Particle Type (3) | Surface charge ($\mu C/cm^2$) (4) | [NaCl] M | pH | Visual aspect on water (5) | Visual aspect on solid (5) | Microscopic observation |
|---|---|---|---|---|---|---|---|---|
| " | — | " | " | " | 3.0 | Granular | Granular | aggregates 3D aggregates |
| 1.170 | 30 | Carboxy 1 | 19 | " | 4.0 | Whitish | Colorful (6) | 2D crystals |
| 1.010 | — | CML | 923 | " | 4.0–3.0 | — | — | Nothing |
| 0.833 | " | CML | 1135 | 1.0 | 7.0 | " | " | " |
| 0.614 | " | Carboxy 1 | 16 | Nil | 4.0 | " | " | " |
| 0.250 | — | CML | 226 | " | 4.0–0.0 | — | — | Nothing |
| " | — | " | " | 2.5–1.5 | 7.0 | Grainy white | Grainy white | 3D aggregates |
| " | <30 | " | " | 1.0 | " | Transparent | Bluish | 2D crystals |
| 0.220* | " | Carboxy YG | Unknown | 1.5 | " | " | " | 2D crystals |
| 0.127 | " | Carboxy 1 | 4 | 1.0 | 7.0 | " | Blue | 2D crystals |
| " | " | " | | Nil | 9.0– | " | " | 2D crystals |
| " | — | " | | " | 7.0–4.0 | Barely visible | " | 2D aggregates |
| " | — | " | | " | 3.5–3.0 | Whitish | " | 3D aggregates |
| 0.053 | — | " | 0.2 | " | 5.0 | — | — | Nothing |
| " | <30 | " | | " | 4.0 | Transparent | Blue | 2D crystals |

Notes

[1] Estimated by the IDC company using a TEM. An average was made with 500 particles chosen at random. However, our estimation based on the microscopic observation of particle 2D arrays and using a standard grid for calibration indicated that the particles were slightly bigger.

[2] These times are the shortest measured with the minimum particle amount to make a monolayer. For 2D array preparations the linear speed of the monolayer preparation was slowed down in order to increase the 2D array proportions. With nanoparticles an optical microscope was used. However, in spite of this approximation, the values are clearly giving an idea concerning the mechanisms acting in the DTLF method.

[3] The polystyrene particle properties depend on the surface functional groups that were created. A relevant parameter is the CCC, for hydrophobic latexes it is either at 0.25 M univalent ion concentration at pH 7.0, or at pH lower than 4.0; for the CML it is univalent ion concentration higher than 1.0 M at pH 7.0.

[4] The surface charge concentration, provided by the producer, is for polystyrene spheres in pure water.

[5] The visual aspect as seen directly from 6.24 $\mu$m down to 0.250 $\mu$m. At smaller sizes, the procedure followed has already been described.

[6] The colors appeared by light interference. In the sunlight, bright rainbow colors could be seen by tilting the particle monolayer. Each color covered alternatively and uniformly the whole surface of the monolayer according of the angle of tilt. This simple observation indicates the homogeneity of the film itself.

* This is the only particle coming from a different producer. Its concentration was 2.5% w/w. Its surface was not characterized, however the production of a particle monolayer could be easily realized.

DISCUSSION

The particle monolayer growth was visible to the naked eye down to 250 nm. It was regulated by the particle injection and could be adjusted so as to be a constant: the response to the injection was an immediate monolayer growth, upon stopping the injection the monolayer speed of preparation gradually stopped within a minute. The growing monolayer reduced the available free A/W interface for particle adsorption, however this reduction seemed not to have affected the speed of preparation, which remained steady. These two observations by themselves already indicate that convection in the thin liquid film under the free A/W interface was the leading process for micro- to nano-particles down to 250 nm. For monolayer preparations with smaller particles the speed of preparation could not be adjusted, instead an injection was made and a particle monolayer was observed in situ with the optical microscope like in the case of proteins. However, the time of preparation was for them also (see Table 1) very short (≈30 s). This suggests that for particles down to 55 nm the Brownian motion was still dominated by convection.

The physico-chemistry of the DTLF method is based on the surface electric charges and their control by pH or salt concentration. It is important to know that the surface charges provided in Table 1 are the result of a computation based on the stiochiometric charges contents. For carboxiland sulphate-coated particles, the computation wholly corresponds to reality. However, for CML particles, the majority of charges are buried, leaving a surface charge density comparable with the other types. This volume distribution makes CML particles behave interestingly. Taking the 0.833-$\mu$m CML spheres as an example, the surface electric charge was 1135 $\mu$C/cm$^2$. The increasing of the subphase acidity up to pH 0.0 could not create the particle adsorption at the A/W interface. For the 1.01-$\mu$m CML spheres with a surface charge of 923 $\mu$C/cm$^2$, the preparation of the particles monolayer occurred at a subphase pH of 2.0. For the 0.250-$\mu$m CML spheres with a surface charge of 226 $\mu$C/cm$^2$, the same conditions as the highly charged 0.833-$\mu$m spheres prevailed. For the carboxyl particles with surface charges less then 20 $\mu$C/cm$^2$, simply increasing the subphase acidity to pH 4.0 was enough to provoke the surface adsorption without creating the formation of 2D aggregates. In the case of the 0.127-$\mu$m particles, the subphase pH could be basic at pH 9.0. In two cases, monolayers of highly charges particles could not be prepared by only increasing the subphase acidity, however, screening the surface charges with salt addition proved to be very efficient. On the contrary for all the particles with the weakest surface charges subphase mild acidic conditions of pH 4.0 were sufficient.

It may be surprising that for the 0.127-$\mu$m particles in the subphase at pH 9.0, a particle monolayer was prepared. This result escapes the theoretical frame, as the adsorption between the particle and the A/W interfaces should not have occurred. It seems that the 0.127-$\mu$m particle behavior changed from the macroscopic to the nanoscopic scale. As a matter of fact, their observation to the naked eye on the water surface became impossible. However using the optical microscope, like in the case of proteins, the monolayer could be observed. The injection of particles yielded a particle monolayer quite rapidly, in a few words their behavior was nearly the one of a surfactant, as there was no formation of aggregate in the bulk. Moreover at the subphase pH below 4.0 the particles adsorbed at the A/W interface and made 2D aggregates. Lowering more the pH provoked the aggregation in the bulk. These two behaviors were observed in the case of the other carboxyl particles.

The experimental data for the time of preparation were compared with the two mathematical models based on Brownian and mechanical convection models (see Table 2).

TABLE 2

Experimental and simulated times for A/W interface full coverage with microspheres.

| Particle Diameter ($\mu$m) | Experimental (1) DTLF | Time for A/W interface full coverage (s) Numerical simulation Brownian (2) | Convect (2) |
|---|---|---|---|
| 6.240 | ≈30 | 1646 | 34 |
| 1.170 | " | 554 | 27 |
| 1.010 | " | 512 | 27 |
| 0.833 | " | 458 | 26 |
| 0.614 | " | 400 | 27 |
| 0.250 | <30 | 230 | 24 |

1 The experimental time is the one of the best performances, i.e. the fastest preparation for the lowest amount of particles injected; usually just enough for preparing a single monolayer.
2 The simulations are for an injected amount of particles just enough to prepare a single monolayer.

The concentration used in the models is given by the producer, i.e. 4% w/w, injected in the 25-$\mu$L meniscus. It must be noted that the time of experimentation is quite approximate. The particle injection was relatively slow, in order to smooth the particle monolayer preparation. For the 6.24-$\mu$m particles down to the 250-nm size, the convection in the thin liquid film was clearly the mechanism by which the particles reached the A/W interface. The Brownian motion alone would have been by far too slow.

However, to better evaluate the potential of the DTLF method, that is the preparation of crystalline monolayers of particles or monolayers in continuous mode, a realistic situation could be that the triple line air/water/monolayer is somewhere between both menisci. Practically, it would be better that this triple line were at the top half circumference prior the transfer, for example, on a solid substrate. Here a rotation frequency of 1 Hz and a 5 $\mu$m thin liquid film can be assumed. Given these parameters, for particles or other ultra-fine particles smaller than 3 nm, the Brownain motion becomes more efficient than the mechanical convection motions to bring particles to the A/W interface. In other words the DTLF method moves big particles mechanically to the A/W interface, while the ultra-small particles will self-diffuse to the water surface. In both cases the final result, which is assembling the particles in a monolayer, is the same. Essentially with the DTLF method the two only parameters to be controlled are the ionic force in the subphase, for the particle A/W adsorption, and the surface force that is pressing the particles onto the monolayer, the surface force being only dependent of the cylinder rotation speed and the thin liquid film thickness.

The particle monolayer preparations produced colorful effects. For one monolayer thick, these effects were most spectacular with particles having about 0.8-$\mu$m diameter. According to a recent publication, interferences due to an optical light paths difference made, by the polystyrene refractive index, could explain the observations. A simple mathematical model based on the reflection of the light on the top of the monolayer and on the air-glass interface below the monolayer, combined with the difference of optical path, fitted very well the experimental data. However in our work a simple experiment was performed to further test this mathematical model. The monolayer was heated mildly at 90° C. for a series of short times, and observed with the optical microscope. The colors disappeared at the very same amount where the spherules started to soften and fuse, giving a smooth-bumped monolayer surface It must be noted that this mild heating did not change the optical path. Thus the mathematical model reported has to be refined, as the film thickness parameter cannot explain the results, this problem will be analyzed in the future.

Another interesting observation came from the above publication by Picard et al. disclosing the DTLF method with proteins. A monolayer was efficiently prepared, in spite of the fact that the protein used was highly hydrophilic. It was dissolved in water with some glycerol to permit its storage at low temperature. Glycerol kept this protean from crystallization and its removal triggered crystallization as the addition of salt does in the subphase for particles. Combined with the control of subphase pH, 2D crystallites with DTLF method were produced. The preparation of protein monolayers is more difficult than with particles, due to self-crystallization, however, the experiments with particles indicated that the basic principles of the DTLF method were quite well understood.

What is claimed is:

1. A method for the preparation of a monolayer of particles or molecules, comprising:
    injecting a thin liquid film containing said particles or molecules onto an external surface of a rotary member;

adjusting a surface charge density of said particles or molecules through the injection of an adsorption reagent, thereby carrying said particles or molecules to a gas-liquid interface of said thin liquid film;

forming a uniform monolayer of said particles or molecules on said gas-liquid interface;

transferring said monolayer from the gas-liquid interface to a solid substrate; and moving said rotary number in a longitudinal direction relatively to said substrate, thereby separating said monolayer from said thin liquid film and adsorbing said monolayer to said substrate.

2. The method according to claim 1, wherein said substrate is hydrophilic;

wherein said thin liquid film is attached to said substrate;

wherein said rotary member moves longitudinally in the same direction as the rotation direction of said rotary member; and wherein said method further comprises sucking said thin liquid film away from said substrate by a suction pump.

3. The method according to claim 2, wherein said substrate comprises a clean glass plate or a mica sheet.

4. The method according to claim 1, wherein said substrate is hydrophobic;

wherein said thin liquid film remains on the external surface of said rotary member;

wherein said rotary member moves longitudinally in a direction opposite to the rotation direction of said rotary member; and wherein said method further comprises sucking said liquid film away from said substrate by a suction pump.

5. The method according to claim 4, wherein said substrate comprises a glass or metal plate.

6. The method according to claim 1, wherein said adsorption reagent comprises an acid solution having a pH of 4.0;

wherein said particles are comprised of polystyrene; and wherein said molecules are proteins.

7. The method according to claim 1, wherein said adsorption reagent comprises a 70% acetonitrile solution;

wherein said particles comprise carbon 60; and wherein said thin liquid film comprises toluene.

8. The method according to claim 1, wherein said adsorption reagent is a salt solution.

9. The method according to claim 8, wherein said salt solution is a cadmium sulfate solution for molecules of proteins of the holoferritin type.

10. The method according to claim 1, wherein said thin liquid film has a thickness of the order of microns.

11. An apparatus for the preparation of a monolayer of particles or molecules, comprising:

a rotary member;

a substrate for receiving said monolayer from said rotary member;

a motor mechanically connected to said rotary member for advancing said rotary member wherein said rotary member is adapted to advance in a longitudinal direction with respect to said substrate to transfer said monolayer from said rotary member to said substrate;

an injection module having a plurality of openings and spaced apart from said rotary member thereby forming a gap therebetween;

a first channel defined by a first opening of said plurality of openings in said injection module for injecting a thin liquid film containing said particles or molecules toward said rotary member upstream of said substrate;

a second channel defined by a second opening of said plurality of openings in said injection module for injecting an adsorption reagent toward said rotary member upstream of said substrate;

a third channel defined by a third opening of said plurality of openings in said injection module connected to a suction pump for removing said liquid film away from said substrate after said monolayer is transferred from the rotary member onto said substrate; and wherein said rotary member is adapted upon rotation for forming said monolayer on a gas-liquid interface of said thin liquid film.

12. The apparatus according to claim 11, wherein said substrate is hydrophilic;

wherein said liquid film is attached to said substrate;

wherein said rotary member can advance in the same direction as the rotation direction of said rotary member.

13. The apparatus according to claim 11, wherein said substrate is hydrophobic;

wherein said liquid film is attached to an external surface of said rotary member; and wherein said rotary member can advance in the opposite direction to the rotation direction of said rotary member.

14. The apparatus according to claim 11, wherein said substrate comprises a glass or metal plate.

15. The apparatus according to clam 11, wherein said substrate comprises a liquid.

* * * * *

UNITED STATES PATENT AND TRADEMARK OFFICE
CERTIFICATE OF CORRECTION

PATENT NO. : 6,284,310 B1
DATED : September 4, 2001
INVENTOR(S) : Picard

It is certified that error appears in the above-identified patent and that said Letters Patent is hereby corrected as shown below:

Title page,
Item [45] and Notice information should read:

-- (45) Date of Patent: *Sep. 4, 2001 --

-- (*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Item [30], the Foreign Application Data should read:

-- (30) Foreign Application Priority Data

May 30, 1997 (IT) ........................ TO97A000466 --

Drawings,
Sheet 2 of 3 and Sheet 3 of 3, Figures 3-7, should be deleted.

Column 3,
Lines 5-12, the description for Figures 3-7, should be deleted.

Signed and Sealed this

Sixteenth Day of April, 2002

*Attest:*

*Attesting Officer*

JAMES E. ROGAN
*Director of the United States Patent and Trademark Office*